No. 782,000.

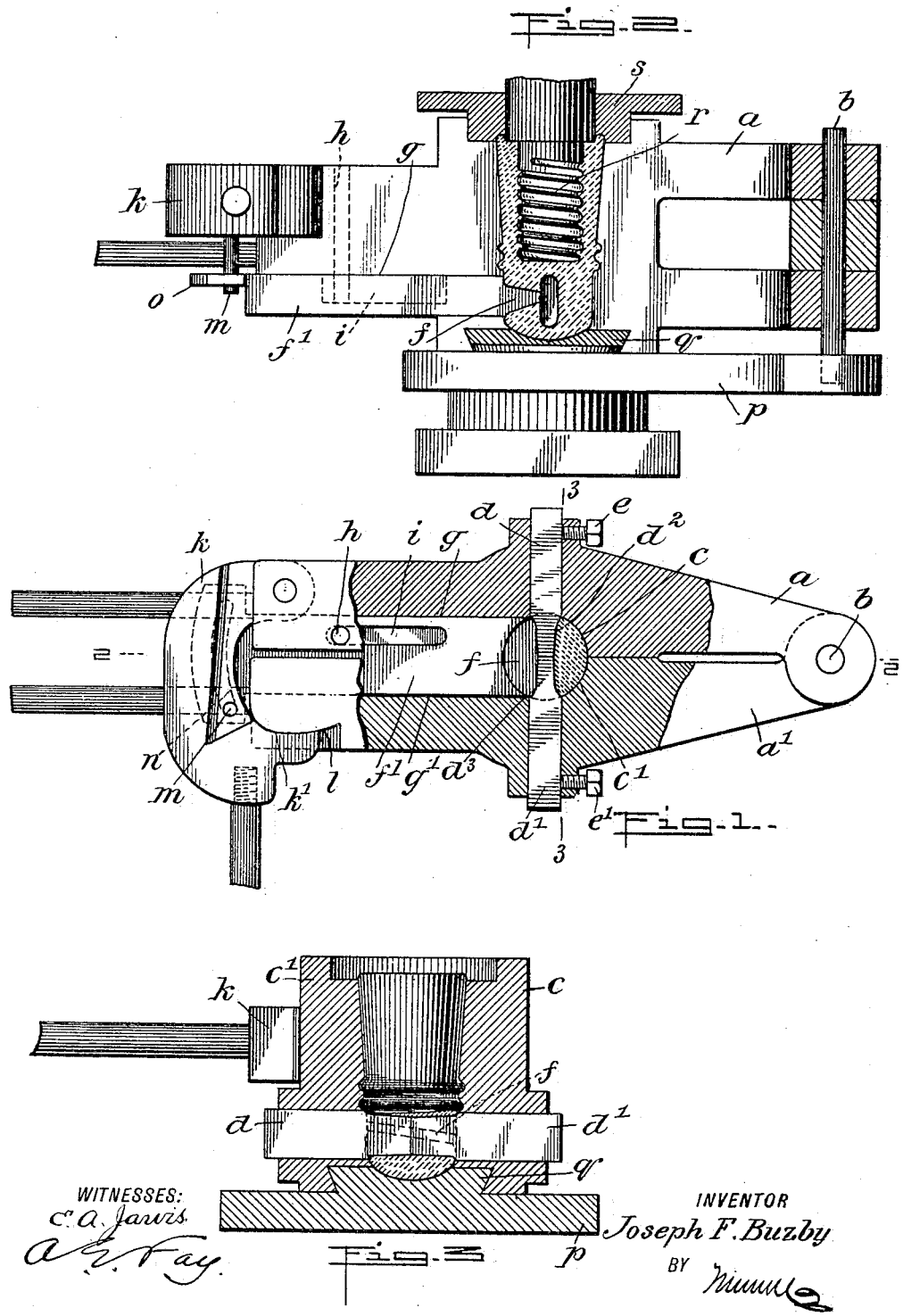

Patented February 7, 1905.

UNITED STATES PATENT OFFICE.

JOSEPH F. BUZBY, OF ROYERSFORD, PENNSYLVANIA.

GLASS-MOLD.

SPECIFICATION forming part of Letters Patent No. 782,000, dated February 7, 1905.

Application filed December 15, 1904. Serial No. 236,946.

*To all whom it may concern:*

Be it known that I, JOSEPH F. BUZBY, a citizen of the United States, and a resident of Royersford, in the county of Montgomery and State of Pennsylvania, have invented a new and Improved Glass-Mold, of which the following is a full, clear, and exact description.

My invention relates to a mold which is especially designed for molding glass insulators for wiring systems; but it will be readily understood that the principle of my invention can be employed in molding other materials and for making other articles.

The invention comprises means whereby a hole entirely through an article can be molded; also, means whereby another hole extending from the exterior surface of the article to the first hole can be efficiently formed.

It also comprises means for locking the mold parts together and for simultaneously unlocking the mold parts and withdrawing one of the cores.

The invention also comprises other features, which will appear in the course of the subjoined description.

I am aware that many forms of molds have been designed for this and similar purposes; but they have usually been open to many objections—as, for example, the cores were easily damaged by the material molded and when damaged the whole mold had to be thrown away or an expensive operation performed upon it to restore it to a useful condition. It has also been difficult heretofore to provide for the drawing of cores and, furthermore, to provide for manufacturing such shaped articles as the one above described.

Reference is to be had to the accompanying drawings, forming a part of this specification, in which similar characters of reference indicate corresponding parts in all the figures.

Figure 1 is a plan view, partly in longitudinal section, illustrating a practical embodiment of my invention. Fig. 2 is a sectional view of the same on the line 2 2 of Fig. 1, but showing the rear section of the mold in elevation; and Fig. 3 is a sectional view on the line 3 3 of Fig. 1.

The preferred form of my invention comprises an ordinary pair of mold-sections $a$ and $a'$, hinged or pivoted together near their outer ends by means of a pin $b$ or the like. This pin or hinge is placed farther from the mold-cavities $c$ and $c'$ than is usually the case, the advantage of which is that the cores deliver perfectly when the mold is opened without causing any breakage. In order to form the hole extending entirely through the article to be molded, a pair of cores $d$ and $d'$ are provided. The parts of these cores which extend within the mold are tapered, as shown at $d^2$ and $d^3$, and they meet each other near the center of the mold at their ends which are thinnest. These molds are removably mounted in the two mold-sections and are secured in position by means of set-screws $e$ and $e'$ or in any other desired manner. It will be readily observed that these cores upon becoming injured can be replaced at very small cost and that they will form the opening through the article as efficiently as the core which has heretofore been used and which ordinarily passes through the mold-sections. In order to form the opening from this hole in the article to the outer surface, a third core $f$ is employed. The part of this core which projects within the mold-cavity is preferably tapered, and for one form of insulator which I employ with this mold it is made on a slant, as indicated in Fig. 3. This core is mounted upon a reciprocable core-carrier $f'$, which in turn is mounted in a groove $g$ in the mold-section $a$. The mold-section is preferably provided with a projection or pin $h$, which extends into a long slot $i$ in the core-carrier $f'$, so as to guide the latter and hold it in position on the mold-section $a$. It is to be understood that the mold-section $a'$ is also provided with a similar groove $g'$ for receiving the core-carrier, but that the latter is not secured to this section. Otherwise the two sections of the mold cannot be readily swung away from each other on their pivot.

In order to lock the two sections of the mold together, a latch $k$ is pivoted to the section $a$ and is provided with a curved surface $k'$. The section $a'$ is provided with a similar curved surface $l$, with which the surface $k'$ is adapted to engage when the latch is swung into the position shown in Fig. 1. The curvature of these two surfaces is such as to produce a wedging action when the latch is swung into this position and will hold the parts securely locked together. The latch is provided with a projection or pin $m$, which projects through a curved slot $n$ in a projection $o$ on the core-carrier $f'$. The curvature of this slot is such that the swinging of the latch about its pivot into engagement with the surface $l$ will cause the projection $m$ to force the core-carrier inward to its extreme position, and likewise the reverse movement of the latch will withdraw the core from the mold-cavity. It will thus be apparent that the operation of the core is automatically accomplished when the mold-sections are locked and unlocked by means of the latch.

In addition to the parts heretofore described the mold is mounted upon a base $p$ by means of a dovetailed projection $q$, and it is provided with a screw-threaded core $r$ when it is desired to produce a screw-threaded opening in the article molded. A plunger $s$ is also provided, as is usually the case.

The operation of molding an article in this apparatus will be readily understood. The two mold-sections are first swung together, carrying with them the cores $d$ and $d'$, and then the latch $k$ is swung around into the position shown in Fig. 1, which will lock the parts together and force the core $f$ into contact with the two cores $d$ and $d'$. A quantity of glass or other material is then introduced and the core $r$ and plunger $s$ forced into the mold in any desired manner. The method of withdrawing the core $r$ is well understood and is not here illustrated or described. The simple swinging of the latch back upon its pivot will then unlock the mold-sections and withdraw the core $f$, and the two main sections can then be separated by swinging them about their pivot $b$, when the article will either drop out or remain in one section, from which it can be readily detached.

It will be apparent that when the principle of my invention is carried out, whether in the form illustrated or in any other form, an efficient and quickly-operable device will be secured for molding complicated objects and that the injury of one of the cores will not result in the loss of the entire mold or mold-sections, but can be readily repaired by the introduction of a new core.

Having thus described my invention, I claim as new and desire to secure by Letters Patent—

1. A mold comprising two sections movably connected together, a latch for holding them in closed position, and a movable core operatively connected with the latch.

2. A mold comprising two sections pivotally connected together, a latch for holding them in closed position pivoted to one of the sections, and a reciprocable core operatively connected with said latch.

3. A mold comprising two movably-connected sections, a latch for locking them in closed position with respect to each other, a core, and means for withdrawing the core when the latch is moved to unlock the sections.

4. A mold comprising two pivotally-connected sections, a latch pivoted to one of said sections for locking the other to it, a core-carrier mounted upon one of the mold-sections, said section having a projection for engaging the core-carrier, a core mounted on said carrier, and means on the latch for engaging said carrier.

5. A mold comprising two movably-connected sections, a latch pivotally connected to one of said sections for locking the other to it, said latch being provided with a projection, and a core-carrier mounted on one of the sections and provided with a curved slot for receiving said projection, whereby the swinging of the latch about its pivot will reciprocate the core-carrier.

6. A mold comprising two movably-connected sections, one being provided with a curved surface on its face opposite the other section, a latch pivotally connected with the other section and provided with a curved surface for engaging the curved surface of the first-named section to lock the latter to the other section, a core, and means for withdrawing the core when the latch is moved to unlock the sections from each other.

7. A mold comprising two movably-connected sections each having a mold-cavity, a movable inclined core mounted on one of said sections and adapted to enter the mold-cavities, and a stationary core mounted in each of said mold-sections.

8. A mold comprising two movably-connected sections each having a mold-cavity, a movable inclined core mounted on one of said sections and adapted to enter the mold-cavities, and a stationary core mounted in each of said mold-sections, said last two cores meeting within the mold, and the first core projecting into the mold far enough to engage said cores.

9. A mold comprising two sections movably connected together and having mold-cavities, a core removably mounted in each of said sections, a reciprocable core mounted on one of the sections and adapted to enter the mold-cavity, and means for withdrawing said last-named core from the cavities.

10. A mold, comprising two sections movably connected together and having mold-cavities, a core removably mounted in a stationary position in each of said mold-sections and projecting into the mold-cavity, each of said cores being provided with a tapering portion the thin ends of which abut against each other in the cavity, and a movable core adapted to enter the mold-cavity.

11. A mold, comprising two main sections pivotally connected together and each having a mold-cavity, a pair of cores each removably mounted upon one of said sections, said cores each being provided with a tapering portion extending into the mold-cavities and meeting each other at their thinnest points, a movable core mounted on one of the sections and provided with a slanting tapering portion projecting into the mold-cavity at an angle of ninety degrees to the other two cores and in contact with them, and a fourth core provided with screw-threads and projecting into the mold-cavity at an angle of ninety degrees to each of the other cores.

In testimony whereof I have signed my name to this specification in the presence of two subscribing witnesses.

JOSEPH F. BUZBY.

Witnesses:
W. H. BUCKWALTAR,
HARVEY L. SHOMO.